Dec. 6, 1960

R. J. TIERNEY 2,963,065

EMERGENCY CHAIN ATTACHING UNIT

Filed March 2, 1960

INVENTOR.
Robert J. Tierney,
BY
McMorrow, Berman & Davidson
ATTORNEYS

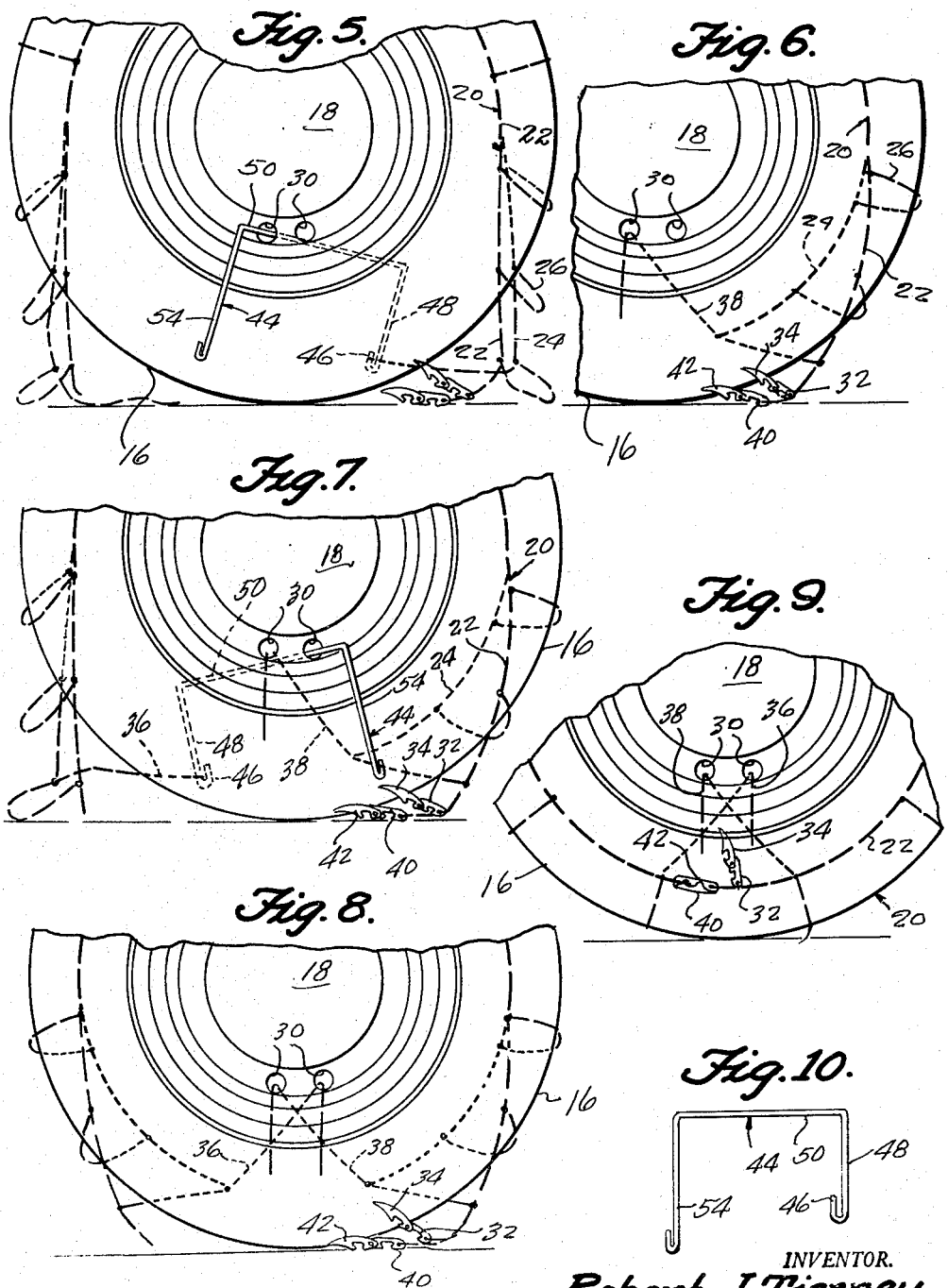

United States Patent Office 2,963,065
Patented Dec. 6, 1960

2,963,065

EMERGENCY CHAIN ATTACHING UNIT

Robert J. Tierney, 731 5th Ave., Altoona, Pa.

Filed Mar. 2, 1960, Ser. No. 12,394

4 Claims. (Cl. 152—241)

The present invention relates generally to emergency chains for automotive vehicles and in particular to an attaching unit for antiskid chains.

Presently available for use on the wheels of automotive vehicles are tire chains of many types. Generally, the chains most widely used consist in side chains with traction links or cross members extending between the side chains. In order to mount the tire chain on a wheel, it is necessary to lay the chain on the ground surface and back up or roll the vehicle forwardly on to the chain, bring the chain up over the tire and then secure the ends of the side chains together.

Frequently, it is not possible to roll the vehicle forwardly or rearwardly in order to mount the midsection of the tire chain. This occurs when the vehicle is unable to proceed in either the forward direction or the rearward direction because of mud, snow, ice, or the like.

In addition to having to roll the vehicle forwardly or rearwardly in order to place the wheel on the tire chain, the person mounting the tire chain on the wheel must reach up under the skirt of a fender of the vehicle, grasp the far end of the tire chain and bring the same over the wheel to the rear where space permits him to attach the ends of the tire chain together.

Present day automobiles have such overhanging fenders or skirts above the wheels that it is impossible for the average person to attach a tire chain to the tire casing on a wheel. To the annoyance of having to reach behind the wheel, a person is inconvenienced by having to wear protective sleeves or the like in order to keep from soiling his clothing.

An object of the present invention is to provide an emergency tire chain attaching unit or element which enables a person to attach a tire chain to a wheel without reaching behind the wheel and without reaching up under the skirt or fender overhanging the wheel.

Another object of the present invention is to provide an emergency tire chain attaching unit or element which enables a relatively unskilled person to attach a tire chain without moving the vehicle or without jacking up the vehicle wheel.

A further object of the present invention is to provide a tire chain and attachment device which is simple in structure, one which requires a minimum amount of alteration in a vehicle wheel for the use thereof, and one which requires a minimum alteration in the tire chain with which it is to be employed.

A still further object of the present invention is to provide a tire chain and mounting device which is efficient when installed, one installed upon a vehicle wheel with ease and facility, and one which is not readily lost therefrom when the vehicle is in motion.

These and other objects and advantages of the present invention will be fully apparent from the following description when taken in conjunction with the annexed drawings, in which:

Figure 5 is a fragmentary elevational view of the vehicle wheel, showing the chain partially installed thereon, the attaching element being shown in a first position of use;

Figure 6 is a fragmentary elevational view similar to Figure 5, showing the element in a second position of use;

Figure 7 is a fragmentary elevational view similar to Figures 5 and 6, showing the attaching element in a third position of use;

Figure 8 is a fragmentary elevational view of the vehicle wheel, showing the tire chain prior to attachment of the ends of the side chains;

Figure 9 is a fragmentary elevational view, showing one of the side chains in the attached position and the other of the side chains prior to attachment; and Figure 10 is an elevational view of the attaching element of the present invention, shown apart from the wheel and tire chain.

Figure 1:
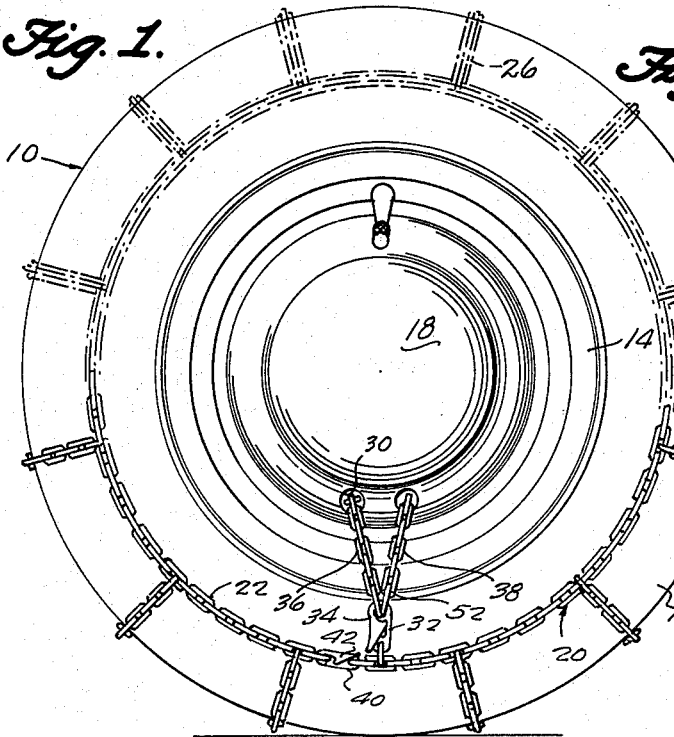
Figure 1 is a view of a vehicle wheel with a tire casing mounted thereon and with the tire chain of the present invention installed thereon, the view being from outside of the wheel.
Figure 2:
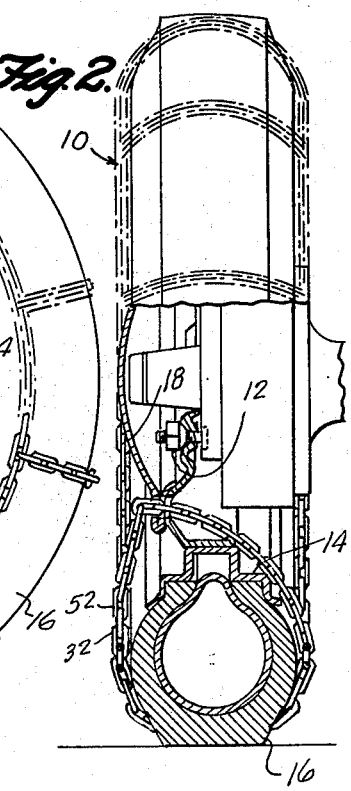
Figure 2 is a view partially in section of the assembly shown in Figure 1.
Figure 3:
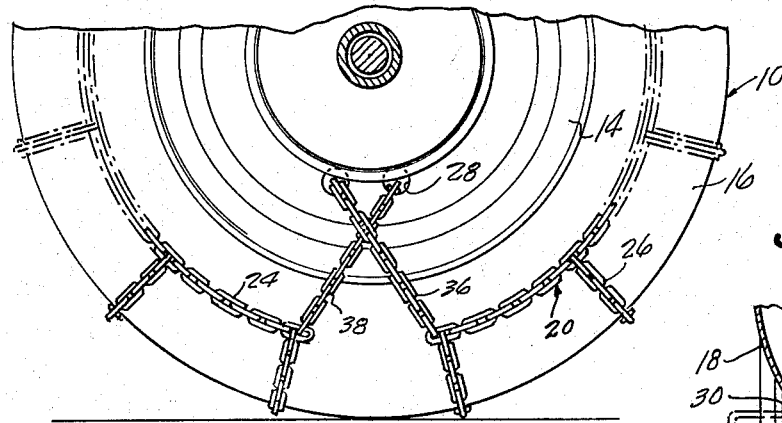
Figure 3 is an elevational view of the assembly shown in Figure 1, shown from inside the wheel.
Figure 4:
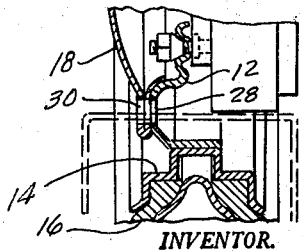
Figure 4 is a fragmentary view of a center part of the wheel shown in Figures 1 to 3, with the attachment element of the present invention shown in dotted lines in a position of use.

Referring in greater detail to the drawings in which like numerals indicate like parts throughout the several views, the reference numeral 10 designates generally a vehicle wheel having a wheel body 12, a rim 14 extending about the wheel body 12, and a tire casing 16 demountably secured in the rim 14. A hub cap 18 is removably positioned over the wheel body 12 and is secured thereto.

The present invention provides a tire chain 20, including a pair of side chains 22 and 24 and a plurality of traction cross members 26 having their ends connected to the side chains 22 and 24.

The wheel body 12 is provided with a hole 28 which is in registry with another hole 30 in the hub cap 18.

There are two holes 30 and two holes 28, although it is conceivable that a single hole would do as well.

The one side chain 22 has adjacent one of its ends a second attaching means, embodying a hook member 32 and releasable lock lever 34, on the side chain 22 inwardly of one of the separated ends.

The other side chain 24 has two separated ends with portions 36 and 38 adjacent each of the separated ends of substantial length.

The side chain 22 has a first attaching means for securing the ends of said chain together, said attaching means embodying a hook member 40 and a lock lever 42, as shown in Figures 1 and 8.

When the chain 20 is to be mounted upon the wheel 10, it is disposed upon the casing 16 so that the cross members 26 on the intermediate part of the chain 20 are supported on the tire casing 16 with the side chain 22 adjacent the outer face of the tire casing and the side chain 24 adjacent the inner face of the casing 16. When the chain 20 is so disposed, end portions of the chain 20 and the separated ends of the side chains 22 and 24 depend loosely from the tire casing 16.

The present invention provides an emergency element for attaching the tire chain 20 to the wheel 10, this element comprising a single U-shaped rod 44 having a hook 46 on the free end of one leg 48, the hook 46 constituting chain link engaging means.

The rod 44 has a bight 50 and the bight 50 and the leg 48 are of sufficient length so that the leg 48 and a portion of the bight 50 may be inserted into the wheel hole 28 and hub cap hole 30 from the outer face of the wheel 10, pass through the holes 28 and 30 to the inner face of the wheel 10 and have the hook 46 interengaged by a link, as at 52, in either one of the end portions of the side chain 24 and, with the interengaged link in the end portion of the side chain 24, withdrawn through the holes 28 and 30 until the link 52 and the adjacent portion of the side chain end portion 24 are visibly positioned at the outer face of the wheel 10 so as to be detachably connected, as shown in Figure 1, with the hook member 32 and releasable lock lever 34.

Similarly, a link on the other end of the side chain 24 is engaged and withdrawn through the holes 28 and 30, as in Figures 8 and 9 and also secured to the hook member 32 and lock lever 34.

In Figures 5 and 6, the rod 44 is shown with a portion of the bight 50 and the one leg 48 inserted through the holes 28 and 30 and engaging a link on the end of the side chain 24.

In Figure 7, the hook 46 on the leg 48 is shown engaging a link on the other end of the side chain 24.

The other leg 54 of the rod 44 serves as a handle for manipulating the bight 50 and leg 48 through the holes 28 and 30 to the position in which the hook 46 may be engaged with the ends of the chain 24.

In use, after the end portions 36 and 38 of the chain 24 have been drawn through the holes 28 and 30 and attached to the hook member 32, and the other ends of the chain 22 are attached together by the hook member 40 and lock lever 42, the chain 20 will be snug around the tire casing 16 and will serve as a traction device for permitting the vehicle to operate efficiently in snow, on ice, or in mud.

What is claimed is:

1. The combination with a vehicle wheel including a wheel body provided with a hole, and a tire casing on said wheel, of a tire chain including a pair of side chains and a plurality of traction cross members connected to said side chains, one of said side chains having a first attaching means for securing the ends of said one chain together, a second attaching means on said one chain adjacent one of the ends thereof, the other side chain having two separated end portions of substantial length, said tire chain being disposed upon said tire casing so that the cross members on the intermediate part of said tire chain are supported on said tire casing with the first-named side chain adjacent the outer face of said tire casing and the second-named side chain adjacent the inner face of said tire casing with the two end portions of substantial length of said other side chain extending through said wheel body hole, said first-named side chain having its ends secured together by said first attaching means, and the ends of said two end portions of substantial length of said second-named side chain being releasably secured to said second attaching means.

2. The combination according to claim 1 wherein said second attaching means comprises a hook member and a releasable lock lever.

3. The combination with a vehicle wheel including a wheel body provided with a pair of spaced holes, and a tire casing on said wheel, of a tire chain including a pair of side chains and a plurality of traction cross members connected to said side chains, one of said side chains having a first attaching means for securing the ends of said one chain together, a second attaching means on said one chain adjacent one of the ends thereof, the other side chain having two separated end portions of substantial length, said tire chain being disposed upon said tire casing so that the cross members on the intermediate part of said tire chain are supported on said tire casing with the first-named side chain adjacent the outer face of said tire casing and the second-named side chain adjacent the inner face of said tire casing with the two end portions of substantial length of said other side chain each extending through one of the holes of said pair of holes in said wheel body, said first-named side chain having its ends secured together by said first attaching means, and the ends of said two end portions of substantial length of said second-named side chain being releasably secured to said second attaching means.

4. The combination according to claim 1 wherein said second attaching means comprises a hook member and a releasable lock lever.

References Cited in the file of this patent

UNITED STATES PATENTS

| 1,642,732 | Holt | Sept. 20, 1927 |
| 2,505,102 | Davis | Apr. 25, 1950 |